I. V. HOLMES.
Metallic-Lathing.
No. 6,590.
Reissued Aug. 10, 1875.
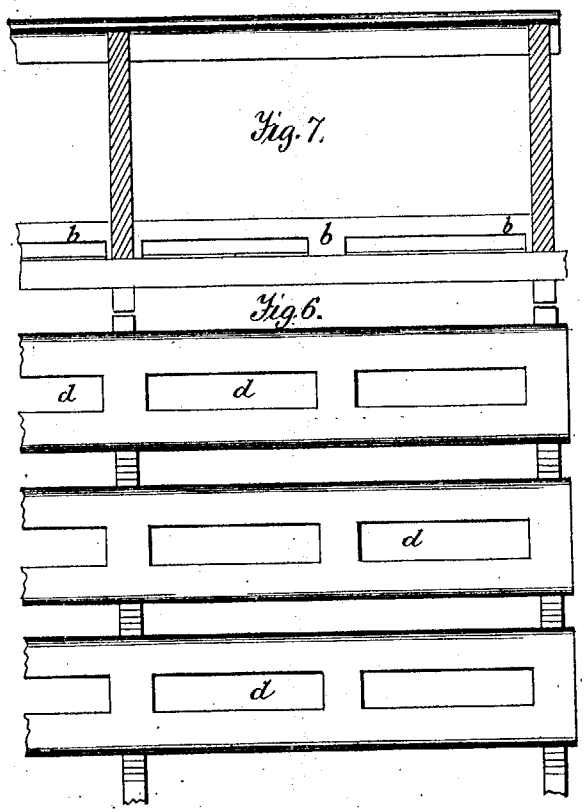
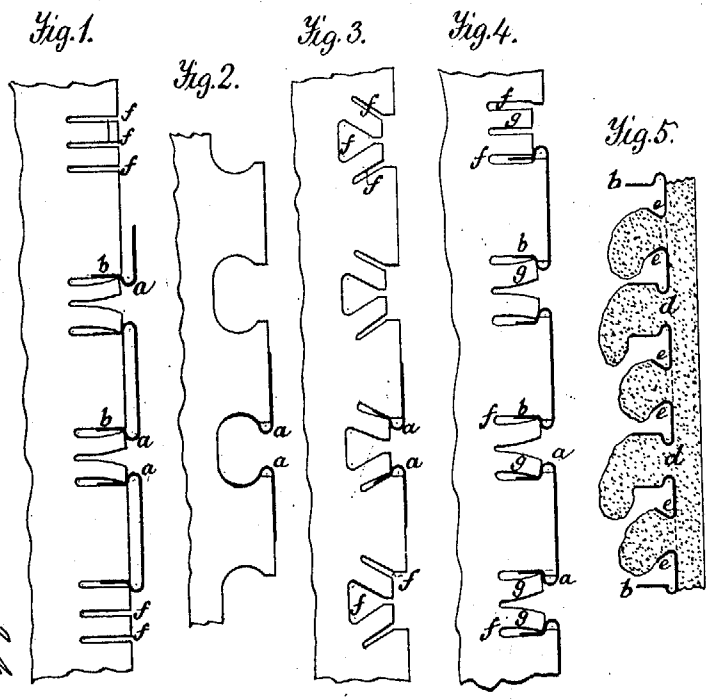
Witnesses.
A. Ruppert.
R. Edw. J. Eils
I. V. Holmes
Inventor.
D. P. Holloway & Co
Attys
THE NORRIS PETERS CO., PHOTO-LITHO., WASHINGTON, D. C.

UNITED STATES PATENT OFFICE.

ISAAC V. HOLMES, OF MOUNT VERNON, OHIO, ASSIGNOR OF ONE-HALF INTEREST TO JOHN COOPER.

IMPROVEMENT IN METALLIC LATHING.

Specification forming part of Letters Patent No. 84,881, dated December 15, 1868; reissue No. 6,590, dated August 10, 1875; application filed October 15, 1874.

*To all whom it may concern:*

Be it known that I, ISAAC V. HOLMES, formerly of the city and county of New York, in the State of New York, now of Mount Vernon, in the county of Knox and State of Ohio, have invented a new and Improved Metallic Lathing, as a supporting-surface for the plaster used upon walls, and of fastening such lathing to the studding which supports it, of which the following is a specification:

This invention relates to that class of frameworks for supporting the plastering of walls and ceilings in which the lathing is composed of narrow sheet-iron laths as contradistinguished from plates of sheet-iron.

It is of the utmost importance to the permanency and excellency of the plastering to secure its equable drying, which will be more or less perfect, according as the back surface of the plaster is left exposed by the laths to a greater or less extent.

Metallic laths have heretofore been made of solid strips of sheet metal, and, as they must necessarily be placed quite close together on the studs, in order to afford a proper support for the plastering, it followed that but comparatively little of the rear of the plastering was exposed when applied to a frame-work of this kind, and that it was apt to crack on account of unequal drying.

To overcome this difficulty, the first part of my invention consists in forming perforations or slots in the laths at short intervals, and making them of angular or curved outline in cross-section, for the purpose of stiffening them longitudinally, to admit of the use of as thin iron as is employed for the ordinary solid sheet-metal laths.

The second part of my invention consists in supporting the laths in recesses in the studs, so that the weight of the plastering shall be transferred by the laths directly to the studs, (not through intermediate fastening devices,) thus making a broad distinction between my mode of supporting the plastering and the old mode, where the laths do not engage the studs directly, but are simply riveted or bolted thereto, so that in the latter case the weight of the plastering is supported by the rivets or bolts. In my case the laths are permanently secured to the studs merely to prevent lateral displacement, and the distinctive feature of this part of my invention is that of supporting the laths in recesses in the studs; for any mode of afterward securing them against lateral displacement may be adopted without affecting the gist of this improvement.

However, I have also made an improvement in the manner of fastening the laths and studs together; and this consists in securing metallic laths to metallic studs by bending one over or upon the other, dispensing entirely with bolts and rivets usually employed for this purpose.

Figures 1, 2, 3, and 4 represent some of the different forms of slits in studs, into the openings of which laths are to be received and fastened. Fig. 5 represents an end view of three laths in position, with the plaster coat spread upon them, and keyed and fastened by portions of the plaster having passed into the openings provided for that purpose, the stud having been removed in order to present this view. Fig. 6 represents an elevation, showing the openings in and between the laths.

To enable others skilled in the art to make and use my invention, I will proceed to describe its construction and operation.

I construct my laths of sheet-iron, of greater or less thickness, according to requirements of the wall as to strength, and of such length as may be cheap in the manufacture, and convenient in the use of them, and of such width as may best secure the same objects, and the additional objects of holding the coat of plaster and its equable and uniform drying, so as to prevent its cracking.

The lath is bent or curved back, so as to provide it with flanges along its edges, which not only constitute stiffening-ribs, but also form broad or wide bearing-surfaces for the plaster key entering between the laths, and serve as a means for interlocking the laths with suitably notched or slitted studs. I make them of uniform thickness and width, except that each lath may be formed so much narrower at one end than at the other as to allow that end to be slipped into the adjoining end of the next lath, so that my laths may be more readily spliced in that way to each other. Such joints may be made either

BEST AVAILABLE COPY between the studs or at the point of being fastened to them, and when at that point laths forming ends may be fastened to the stud by the same operation, as hereinafter described.

I bend back equal portions of both the upper and lower edges *b b* of the lath, and such portions of each as will be sufficient, when so bent back, to hold, in conjunction with the similar bent edge of the next adjacent lath, the plaster when forced between them.

In the example illustrated, the bent portions or flanges are approximately straight, and stand at nearly right angles to the flat face of the lath.

The series of slits, three in each series, *f f f*, are made in the front edges of the studs for the reception of these edges, leaving proper intervals between each and the next, so that the laths, when their edges are inserted in the slits, may be confined and fastened, as hereinafter described, and as shown in the drawings, by the tongues *g g*.

The lath may be so constructed as to present beaded corners, *a a a*, which co-operate with the edges *b b*, to hold the mortar in place when forced between two adjoining laths. Then, as a further means of fastening the plaster in position, securing its equable drying, and preventing its cracking, I make openings *d d* in the lath, of such length and at such intervals apart as may best attain the object in view.

In the example illustrated these openings are formed in the following manner: I cut or punch two slits parallel to each other across the face of the lath, and as wide apart as the opening is intended to be long, and equidistant from the upper and lower edges of the face of the lath. Then I cut or punch a longitudinal slit in the center of the lath, extending from one of these cross-slits to the other, and then bend back from the face of the lath each edge *e e* of the slit, just as I bent back each edge of the lath itself, as before described; and I do this not only to make the opening for the mortar to enter, thus removing a portion of the smooth lath-surface, but also in order that these bent-back edges of the slit may aid the bent-back edges of the lath *b b*, and the beaded corners *a a a a*, to key and hold the plaster coat firmly in place, as shown at *d* and *e e e e*, Fig. 5. The edges of the iron studs are, of course, presented to the laths at the points where the two edges of adjacent laths are to be fastened upon them, and there a series of three slits is cut, *f f f*, and thus the two tongues *g g* are formed. The lower edge of one lath is placed in the upper slit in the stud, and the upper edge of another lath is placed in the lower slit (of same series) in the stud, and then a drift-tool or wedge is driven into the middle slit, and by one operation, and perhaps by one blow upon the tool, the edge of each lath is securely fastened by the mere bending down upon it of the iron tongues *g g*, and thus the laths are fastened upon the stud without either bolt, nail, or screw, when the tool is withdrawn.

By this my arrangement of the laths upon the studding, they may be placed just as far apart as may be desired, in order to make the most effectual use of the beaded corners *a a a a* and the edges *b b'*, and to secure the objects before mentioned.

By my construction of my laths, and their arrangement upon the studding, a much larger portion of the plaster used can be reached and dried by the air on the rear side of the coat than by any other known or used heretofore.

The bending back the edges of the laths, and the edges of the slits made in forming the openings, as described, greatly increases the stiffness of the lath, and thus enables it to resist more effectually pressure or concussions upon its surface.

I do not claim, broadly, the openings herein described, when made generally and in any metallic sheet-lathing, such openings having been before made in broad sheets of metal used for lathing without regard to their size or form.

What I claim, and desire to secure by Letters Patent, is—

1. A sheet-metal lath having its edges bent or curved back in a manner accomplishing the twofold purpose of stiffening the laths and affording a broad bearing for the plaster-key.

2. A perforated sheet-metal strip-lath, stiffened by having its edges bent or curved back.

3. The metallic sheet-lath described, when provided with rectangular openings, made by slitting the lath and bending back the edges *e e*, substantially as and for the purpose described.

4. Lathing composed of studs provided with recesses, and laths supported in said recesses, substantially as and for the purpose specified.

5. The combination of a metallic stud and a metallic lath, connected and secured together by bending one over or upon the other.

6. A lath, when constructed of sheet metal, with its edges bent back, so as to present to beaded corners *a a a a*, and applied substantially as and for the purpose described.

7. The construction of the described metallic sheet-lath, when made with a tapered form at one end, with a view to splicing or jointing, substantially as described.

8. The metallic plates, slitted as described, when used for studs or supports for metallic sheet-laths, substantially as shown, and for the purpose described.

In witness whereof I have signed my name to this specification in the presence of two subscribing witnesses.

Witnesses: ISAAC V. HOLMES.
S. T. DOUTHIRT,
JOHN COOPER.